United States Patent
Yasu et al.

(10) Patent No.: US 8,128,097 B2
(45) Date of Patent: Mar. 6, 2012

(54) MECHANICAL SEAL

(75) Inventors: Satoshi Yasu, Minato-ku (JP); Kenji Kiryu, Minato-ku (JP); Koji Kametaka, Minato-ku (JP)

(73) Assignee: Eagle Industry Co., Ltd., Tokyo (JP)

( * ) Notice: Subject to any disclaimer, the term of this patent is extended or adjusted under 35 U.S.C. 154(b) by 231 days.

(21) Appl. No.: 12/303,905

(22) PCT Filed: Jun. 4, 2007

(86) PCT No.: PCT/JP2007/061271
§ 371 (c)(1),
(2), (4) Date: Dec. 10, 2008

(87) PCT Pub. No.: WO2007/142177
PCT Pub. Date: Dec. 13, 2007

(65) Prior Publication Data
US 2010/0237564 A1    Sep. 23, 2010

(30) Foreign Application Priority Data
Jun. 8, 2006    (JP) ................................. 2006-159940

(51) Int. Cl.
*F16L 3/04*    (2006.01)
(52) U.S. Cl. ....................... 277/375; 277/358
(58) Field of Classification Search ............ 277/358, 277/372, 373, 375, 389
See application file for complete search history.

(56) References Cited

U.S. PATENT DOCUMENTS

| | | | | |
|---|---|---|---|---|
| 2,554,406 A | * | 5/1951 | Hastings et al. | 277/373 |
| 2,598,886 A | * | 6/1952 | Brummer | 277/373 |
| 4,403,780 A | * | 9/1983 | Potter | 277/375 |
| 6,145,841 A | * | 11/2000 | Maeda | 277/358 |
| 6,398,223 B1 | * | 6/2002 | Radosav | 277/352 |
| 6,568,687 B2 | * | 5/2003 | Radosav | 277/389 |
| 6,789,803 B2 | * | 9/2004 | Radosav | 277/377 |
| 2002/0047240 A1 | * | 4/2002 | Radosav | 277/389 |
| 2005/0230923 A1 | * | 10/2005 | Kametaka et al. | 277/602 |

FOREIGN PATENT DOCUMENTS

| | | |
|---|---|---|
| JP | 6-156320 A | 6/1994 |
| JP | 10-122185 A | 5/1998 |
| JP | 2000-74226 | 3/2000 |

* cited by examiner

*Primary Examiner* — Gilbert Lee
(74) *Attorney, Agent, or Firm* — Arent Fox, LLP

(57) ABSTRACT

The present invention provides a mechanical seal preventing the deformation of the cartilage and exhibiting a good sealing performance. In said mechanical seal, the deformation of the back portion of the cartilage due to the force from the pump housing is absorbed by forming a groove portion having cross section substantially a triangular shape at the back portion of the cartilage. As a result, the deformation hardly transfers to the area near the inner tube portion of the cartilage 16 and the inner tube portion of the back portion; and the relative position of the seal ring, and the bellows or so scarcely changes with respect to the structure of the mating ring or so on the side of the rotation axis, thus the assembling length and the assembled load of the mechanical seal does not change, which allows the mechanical seal to exhibit good sealing performance.

3 Claims, 9 Drawing Sheets

(PRIOR ART)

(PRIOR ART)

MECHANICAL SEAL

TECHNICAL FIELD

The present invention relates to a mechanical seal for a water pump or so suitable to apply, for example, to a coolant pump of a car engine.

BACKGROUND ART

As for a conventional mechanical seal of the water pump suitable for the coolant pump or so of the car engine, for example, the mechanical seal disclosed in published Japanese patent application No. 2000-74226 (Patent Document 1) may be mentioned. The mechanical seal disclosed in the patent document 1 comprises a constitution as shown in the cross sectional structure of FIG. 8. That is, a mating ring 11 is engaged and fixed to the sleeve 13 via a cup gasket 12, and rotates along with a rotation axis 2. A seal ring 14 which slides with respect to the mating ring 11 is engaged in the cartilage 96 which engages with a pump housing 3, along with a bellows 15, a case 17, a driving band 19 and a coiled wave spring 18. Then, the seal ring 14 is pressed against mating ring 11 by the biasing force of the bellows 15 and the coiled wave spring 18, and the appropriate surface pressure is applied to the sliding face between these, thus performs appropriate sealing.

Patent Document 1: Published Japanese patent application No. 2000-74226

DISCLOSURE OF INVENTION

Problems to be Solved by the Invention

In the conventional mechanical seal 9 shown in FIG. 8, when the cartilage 96 is engaged with the pump housing 3, a force is applied to the cartilage 96 in a radial direction of the rotation axis 2. Whereupon, the side face 96b in which the pump housing 3 of the cartilage 96 contacts, and the back portion 96d which connects a side face 96b and an inner tube 96a where the seal ring 14 or so are provided, are connected by the curved portion (R) 96c. Thus the force applied from the pump housing 3 does not only act in the radial direction, but also will act in the axial direction as well.

Also, because the back portion 96d is a part where the materials are formed in the radial direction, it is difficult to deform in the radial direction, but easy to deform in the axial direction. Particularly, the conventional cartilage 96 as shown in FIG. 8 has flat back portion 96d, therefore the whole area is easy to deform in the axial direction.

Furthermore, particularly as the conventional mechanical seal 9' shown in FIG. 9, when the distance between the rotation axis 2 and the pump housing 3 is long, the back portion 96d' of the cartilage 96' must be elongated to be engaged and fixed. In the conformation having flat back portion, the cartilage is easily deformed in the axial direction despite the length of the back portion (the distance between the rotation axis and the pump housing) as described above, and furthermore, as shown in FIG. 9, the longer the distance between the rotation axis 2 and the pump housing 3 becomes, the larger the moving distance of the cartilage 96' in the axial direction becomes.

Therefore, in the conventional mechanical seal, when the cartilage is provided to the pump housing, a problem such as the deformation of the back portion of the cartilage in the axial direction occurs, due to the force applied from the pump housing. Furthermore, if such deformation occurs, the assembling load of the mechanical seal changes as the change in the assembling length, so that another problem that a good seal performance cannot be attained occurs.

The present invention is attained by reflecting such objectives, and its aim is to prevent; the deformation of the cartilage of the mechanical seal in the axial direction when the mechanical seal is engaged with the pump housing, and the change of the assembling length of the mechanical seal, thereby to provide a mechanical seal which can assure the good seal performance.

Means for Solving Problems

In order to solve above said objectives, a mechanical seal of the present invention is characterized by comprising; a mating ring as a sliding member fixed to a rotation axis, a cartilage fixed to a housing, and a seal ring attached to said cartilage for sliding with respect to said mating ring; wherein said cartilage comprises an outer peripheral portion fixed to said housing, an inner peripheral portion placed around said rotation axis and provided with said seal ring and a back portion substantially perpendicular to the direction of said rotation axis connecting said outer peripheral portion and said inner peripheral portion; and wherein a bending portion bending in a direction of said rotation axis, is formed on said back portion of said cartilage in a ring shape taking said rotation axis as a center.

According to the mechanical seal of the present invention having such constitution, because the part which the member of the back portion is bent in the axial direction of the rotation axis is formed halfway on said back portion of said cartilage, the deformation in the axial direction of the back portion of the cartilage generated, for example, by the used environment or so when the mechanical seal is engaged with the pump or so, can be absorbed by the bending portion. That is, even if the exterior part of the back portion of the cartilage is deformed in an axial direction due to the effect of the force from the housing, this deformation is absorbed by the bending portion. The deformation of the interior part of the back portion of the cartilage, that is, the deformation of the parts where the seal ring or so are placed can be suppressed, or even if it is deformed, it can be kept to a very small deformation. As a result, the change in the assembling length of the mechanical seal can be prevented, and thereby a good seal performance can be assured.

Preferably, the mechanical seal of the present invention is characterized by a groove portion having a concave shape in cross section formed on said back portion of said cartilage in said ring shape taking said rotation axis in a center.

In the mechanical seal of the present invention having such constitution, particularly because the groove portion having a concave shape in cross section is formed halfway on the back portion of the cartilage, the deformation of the outer part of the back portion of the cartilage can be absorbed appropriately, and the deformation inside the cartilage where the seal ring or so are provided an be suppressed or repressed, which allows to prevent the change in the assembling length of the mechanical seal, thereby assuring a good seal performance.

Also, preferably, the mechanical seal of the present invention is characterized by, forming said back portion of said cartilage so that a position of axial directions of said back portion differ between an inner area and an outer area in radial direction of said rotation axis; and a step portion connecting said inner area and the outer area is formed in said ring shape taking said rotation axis as a center.

In the mechanical seal of the present invention having such constitution, particularly because the step portion is formed halfway on the back face portion of the cartilage, the deformation of the exterior portion of the back portion of the cartilage can be absorbed appropriately, and the deformation inside the cartilage where the seal ring or so are provided can be suppressed or repressed, allowing to prevent the change in the assembling length of the mechanical seal, thereby a good seal performance can be assured.

BEST MODE FOR CARRYING OUT THE INVENTION

An embodiment of the present invention will be explained referring FIGS. 1 to 7.

In the present embodiment, the present invention will be explained by referring to the mechanical seal suitable to be used, for example, as the sealing device of the coolant pump of the car engine.

First, the constitution of the mechanical seal of the present embodiment will be explained referring to the FIG. 1.

Figure 1:
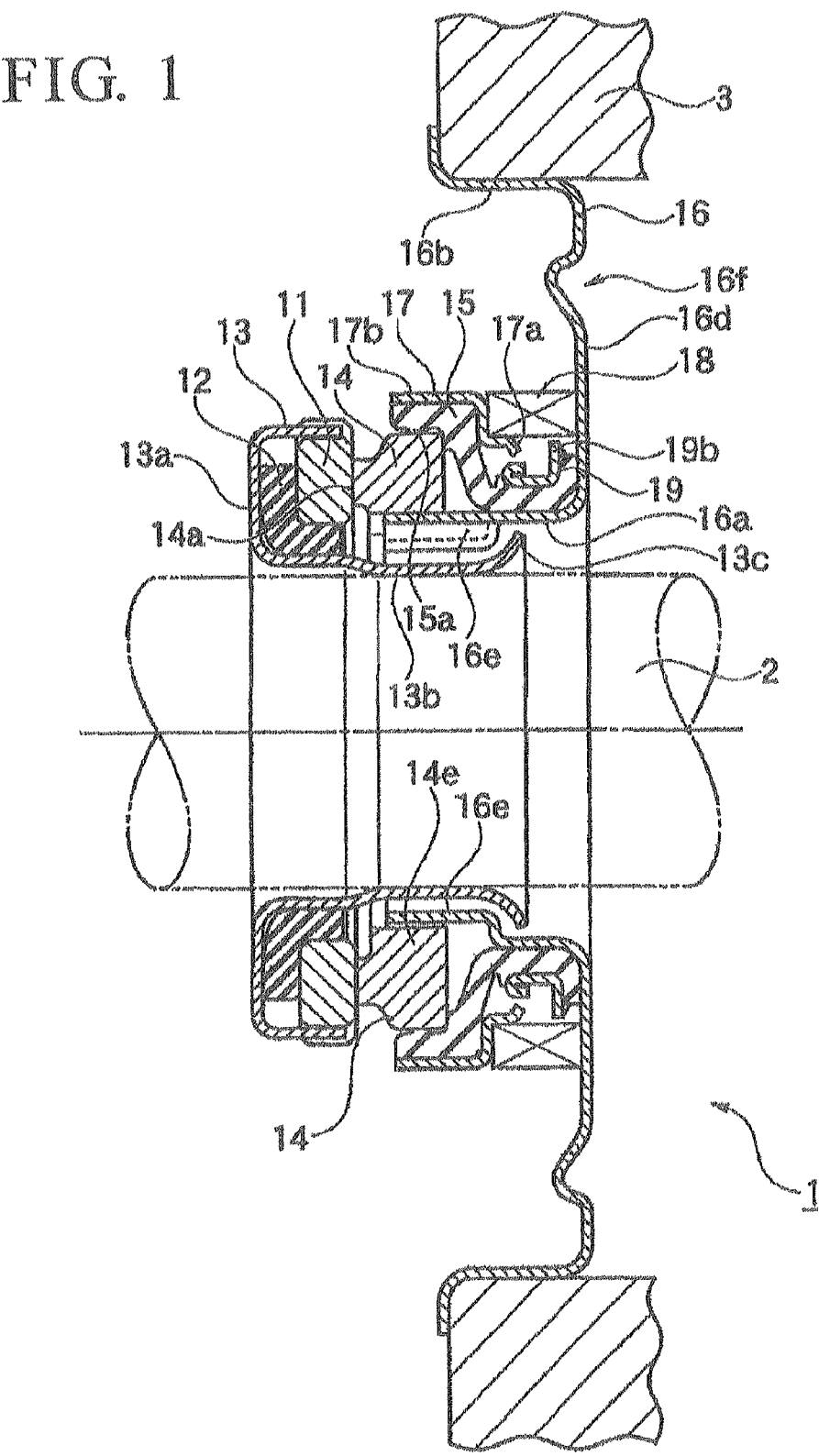
FIG. 1 is a cross section showing the constitution of the mechanical seal of a preferred embodiment of the present invention.

As shown in FIG. 1, the mechanical seal 1 comprises; a mating ring 11, a cup gasket 12, a sleeve 13, a seal ring 14, a bellows 15, a cartilage 16, a case 17, a coiled wave spring 18 and driving band 19.

The mating ring 11 is a sliding member which contacts with the seal ring 14 on the side of the pump housing 3, and rotates along with the rotation axis 2. The inner peripheral side and the back face side of the mating ring 11 is press fixed into an end portion 13a in which the cross section shape of the sleeve 13 fixed into the rotation axis 2 is substantially the shape of letter (Japanese katakana character "コ"(ko)). Also, although it is not shown in the figures, in the mating ring 11 and the sleeve 13, one or several slit portions are provided at the outer peripheral part of the mating ring 11, and in order to correspond to this, a part having a hook shape is provided at the outer peripheral of the sleeve 13. These require somewhat of a clearance to engage, however due to the rotation of the mating ring 11 by the sliding torque, the end of the slit part of the mating ring 11 and the end of the hook shape part of the sleeve 13 comes into contact, and suppresses the rotation of the mating ring 11.

The seal ring 14 is fixed to the pump housing 3, and is a member which slides with respect to the mating ring 11. The seal ring 14 is provided adjacent to the bellows 15, and furthermore it is installed in the cartilage 16 with the case 17, the driving band 19 and coiled wave spring 18.

The outer peripheral portion 17b of the case 17 is molded into a taper shape in advance, and after setting the seal ring 14 to the inside of the inner tube portion 15a of the bellows 15, the seal ring 14 and the bellows 15 are fixed by tightening the outer peripheral portion 17b of the case 17 from the outer peripheral side.

Also, a rotation stopper (a ridge portion 14e of the seal ring 14 and the ridge portion 16e of the cartilage 16) is provided at a position where the inner diameter part of the seal ring 14 and the inner tube face 16a of the cartilage 16 each facing to the other, thus it is structured so that the rotation and the twist in the radial direction of the seal ring 14 due to the sliding torque can be suppressed.

The bellows 15 is a member sealing the fluid to be sealed, and also provides an urging force to the seal ring 14 in appropriate axial direction. The bellows 15 is generally formed by rubber as an elastic body. The bellows 15 is fixed to the inner tube portion 16a of the cartilage 16 by equipping the case 17 and the driving band 19 around the outer peripheral of the bellows 15.

In order to determine the position whereupon installing the bellows 15 to the appropriate position of the cartilage 16, an end surface 17a of the case 17 is bent and said end face 17a is opposing the end surface 19b of the driving band 19. That is, by pushing the outer peripheral portion 17b of the case 17 towards the right side of the figure to apply a force to the direction in which the coiled wave springs 18 closely contacts, then the end face 17a of the case 17 and the end face 19b of the driving band 19 come into contact which pushes the driving band 19 to the right, and consequently the bellows 15 is installed in appropriate position with respect to the inner tube portion 16a of the cartilage 16.

Then the bellows 15 is fixed to the inner tube portion 16a of the cartilage 16 using the driving band 19, thereby the slip against the sliding torque can be prevented.

The coiled wave spring 18 is provided between the case 17 and the cartilage 16. The coiled wave spring 18 biases the bellows 15 to the direction of the seal ring 14 in the axial direction.

The cartilage 16 comprises; the outer tube portion (outer peripheral portion) 16b fixed to the pump housing 3, the inner tube portion (inner peripheral portion) 16a in which the seal ring 14 and the bellows 15 or so are installed by placing around the rotation axis 2; and the back portion 16d provided in perpendicular direction (radial direction) with respect to the axial direction of the rotation axis 2 so that the outer tube portion 16b and the inner tube portion 16a are connected. Thereby the cartilage 16 is formed into a ring shape member having the shape of the cross section substantially the letter of "コ" (Japanese katakana character of "コ"). As mentioned above, in the inside of the cartilage 16 having this shape substantially the letter of "コ", the seal ring 14, the bellows 15, the case 17, the coiled wave spring 18 and the driving member 19, which are the members of the mechanical seal 1 on the side of the pump housing 3, are provided. Concretely, these seal ring 14 to driving member 19 are installed at the inner tube portion 16a of the cartilage 16 and at the back portion 16d near the inner tube portion 16a.

Also, a part of the inner tube portion 16a of the cartilage 16 is further formed into the ridge portion 16e protruding out towards the side of the rotation axis 2, as mentioned above, the ridge portion 14e formed at the inner diameter portion of the seal ring 14 engages with in the inner tube portion 16a of the cartilage 16, and has a structure of a rotation stopper so that the twist against the circumference direction of the seal ring 14 due to the sliding torque can be suppressed.

Furthermore, particularly in the cartilage 16 of the mechanical seal 1 of the preferred embodiment, the groove portion (bent portion) 16f having a cross section substantially a triangular shape as shown in the figure is formed halfway on the back portion 16d at the side of the outer tube portion 16b where the flat board area has no mechanical seal member installed, rather than the position where the coiled wave spring 18 contacts. The constitution member of the cartilage 16 has certain degree of roundness in the direction of the rotation axis 2, that is, it is bent with certain degree of R value (bending modulus) to form this groove portion 16f. Also, the groove portion 16f is formed in a ring shape, that is, in a groove shape, at the back portion 16d of the cartilage 16 taking the rotation axis 2 as the center.

By forming the groove portion 16f having such cross sectional shape at the back portion 16d of the cartilage 16, even if the back portion 16d of the cartilage 16 is deformed in the axial direction and the radial direction of the rotation axis 2, due to the force in the radial direction of the rotation axis 2 which is applied to the cartilage 16 when the cartilage 16 engages with the pump housing 3, the deformation is absorbed by this groove portion 16f. As a result, this deformation hardly transfers to the area near the inner tube portion 16a of the cartilage 16 and to the inner tube portion 16a of the back portion 16d; and these parts are hardly deformed. That is, the relative position of the seal ring 14 and the bellows 15 scarcely changes with respect to the structure of the mating ring 11 or so on the side of the rotation axis 2.

The mechanical seal 1 having a constitution described in the above, as described before, the mating ring 11 is press fixed into an end portion 13a in which the cross section shape of a sleeve 13 fixed into the rotation axis 2 is substantially the shape of letter "ɔ"(Japanese katakana character ). On the other hand, after the seal ring 14 and the bellows 15 are engaged into the cartilage 16, the inner tube portion 13b of the sleeve 13 is inserted inside the inner tube portion 16a or the lower groove portion 16e of the cartilage 16, and by expanding the tip portion 13c of the inner tube portion 13b of this sleeve 13, one mechanical seal device is produced integrally.

Also, the sliding face 14a of the seal ring 14 is pressed by appropriate surface pressure against the mating ring 11 due to the biasing force exerted from the bellows 15 and the coiled wave spring 18 when these are compressed in the axial direction; and thereby a desired seal effect can be obtained.

Also particularly, according to the mechanical seal 1 of the present preferred embodiment, because the groove 16f, which the cross section is formed in a concave shape by bending the back member, is formed in a ring shape at the back portion 16d of the cartilage 16, when the cartilage 16 is engaged to the pump housing 3, the deformation in the axial direction and the radial direction of the rotation axis 2 which affects the back portion 16d of the cartilage 16 is absorbed by this groove portion 16f. As a result, this deformation hardly transfers to the area near the inner tube portion 16a of the cartilage 16 and to the inner tube portion 16a of the back face portion 16d; and these parts are hardly deformed. That is, the relative position of the seal ring 14 and the bellows 15 or so scarcely changes with respect to the structure of the mating ring 11 or so on the side of the rotation axis 2. Therefore, the assembling length of the mechanical seal barely changes, and along with that the assembling load also scarcely changes; thereby the mechanical seal 1 can exhibit a good sealing performance.

Next, the example of the deformation regarding the mechanical seal 1 of the present preferred embodiment will be explained.

In the mechanical seal 1 as described above, the cartilage 16 had a constitution in which the groove portion 16f having a cross section of concave shape provided in a ring shape taking the rotation axis 2 as a center. However, the present invention is achieved by placing a structure which is the constituting members of the back portion of the cartilage bending in the axial direction of the rotation axis; and it may be other embodiment.

Figure 2:
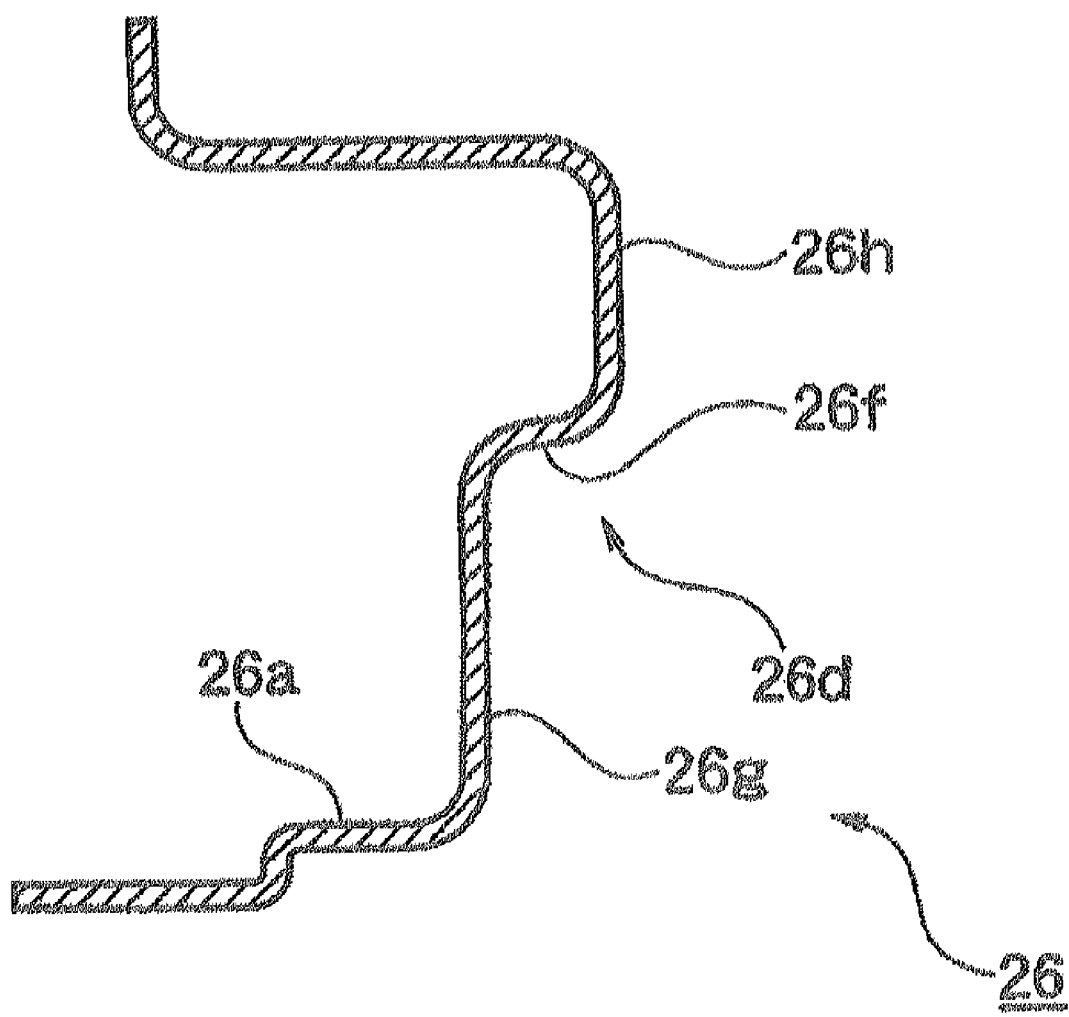
FIG. 2 is an example of the deformation of the cartilage of the mechanical seal illustrated in FIG. 1.

For example, as shown in FIG. 2, the cartilage 26 may be a constitution having a step 26f formed on the back portion 26d. The cartilage 26 shown in FIG. 2 is formed so that the inner area 26g and the outer area 26h of the back portion 26d differ in the axial positions of back portions. That is, it is formed in a step form. More specifically, the cartilage 26 has a configuration which the outer area 26h protrudes towards the outer direction opposite of the axial direction of the seal ring, with respect to the inner area 26g where the seal ring or so are provided. Then, the connection portion is formed so that it connects these inner area 26g and the outer area 26h. Note that, this connection portion and the area near the connection portion of the inner area 26g and the outer area 26h are referred as step portion 26f.

Note that, in the mechanical seal applying the cartilage 26 as shown in FIG. 2, the constitution except for the cartilage is exactly the same as the mechanical seal 1 described above. Therefore, the constitution thereof will be explained using the same notes of the FIG. 1, hereinafter.

In the mechanical seal inserting by means of this cartilage 26, the deformation in the axial direction and the radial direction of the rotation axis affecting the outer area 26h of the back portion 26d of the cartilage 26 when the cartilage 26 is inserted into the pump housing 3, is absorbed by the step portion 26f of the back portion 26d. As a result, this deformation hardly transfers to the inner tube portion 26a and the inner area 26g of the cartilage 26 where the seal ring 14, the bellows 15 or the coiled wave springs 18 are inserted; and these areas hardly deforms. That is, the relative position of the seal ring 14 and the bellows 15 or so with respect to structure of the mating ring 11 or so on the side of the rotation axis 2 barely changes. Therefore, the assembling length of the mechanical seal 1 barely changes, and along with that the assembling load barely changes, so that a good seal performance can be maintained and exhibited.

Figure 3:
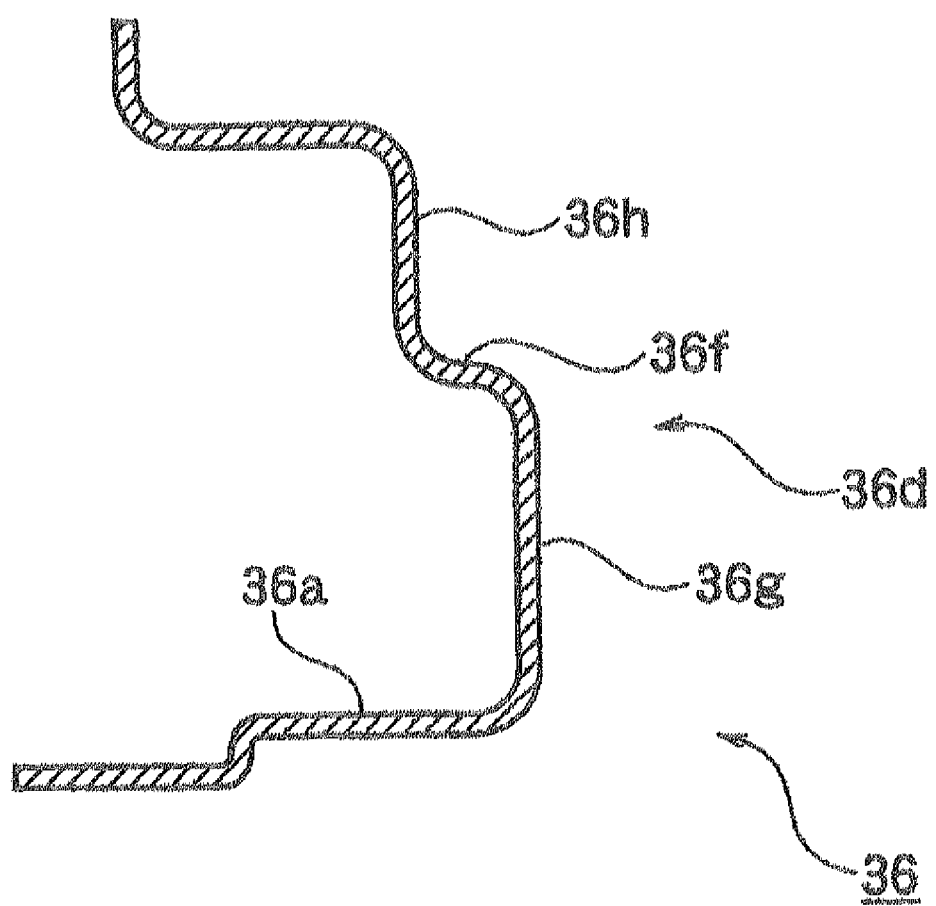
FIG. 3 is another example of the deformation of the cartilage of the mechanical seal illustrated in FIG. 1.

Also, when making a step at the back portion as such, the relation of the ridges and the grooves of the inner area and the outer area may be opposite. The cartilage 36 with such configuration is shown in FIG. 3. In the cartilage 36 shown in FIG. 3, with respect to the inner area 36g where the seal ring or so are inserted, the outer area 36h has a configuration protruding towards the seal ring direction in axial direction, and the step portion 36f is formed so that it connects the inner area 36g and the outer area 36h.

In the mechanical seal using this cartilage 36, the deformation in the axial direction and the radial direction of the rotation axis in case the cartilage 36 is inserted into the pump housing which affects the outer area 36h of the back portion 36d of the cartilage 36, is absorbed by the step portion 36f of the back portion 36d. As a result, this deformation hardly transfers to the inner tube portion 36a and the inner area 36g of the cartilage 36 where the seal ring 14, the bellows 15 or the coiled wave springs 3 are inserted; and these areas hardly deform. That is, the relative position of the seal ring 14 and the bellows 15 or so with respect to structure of the mating ring 11 or so on the side of the rotation axis 2 barely changes. Therefore, the assembling length of the mechanical seal 1 barely changes, and along with that the assembling load barely changes, so that a good seal performance can be maintained and exhibited.

Figure 8:
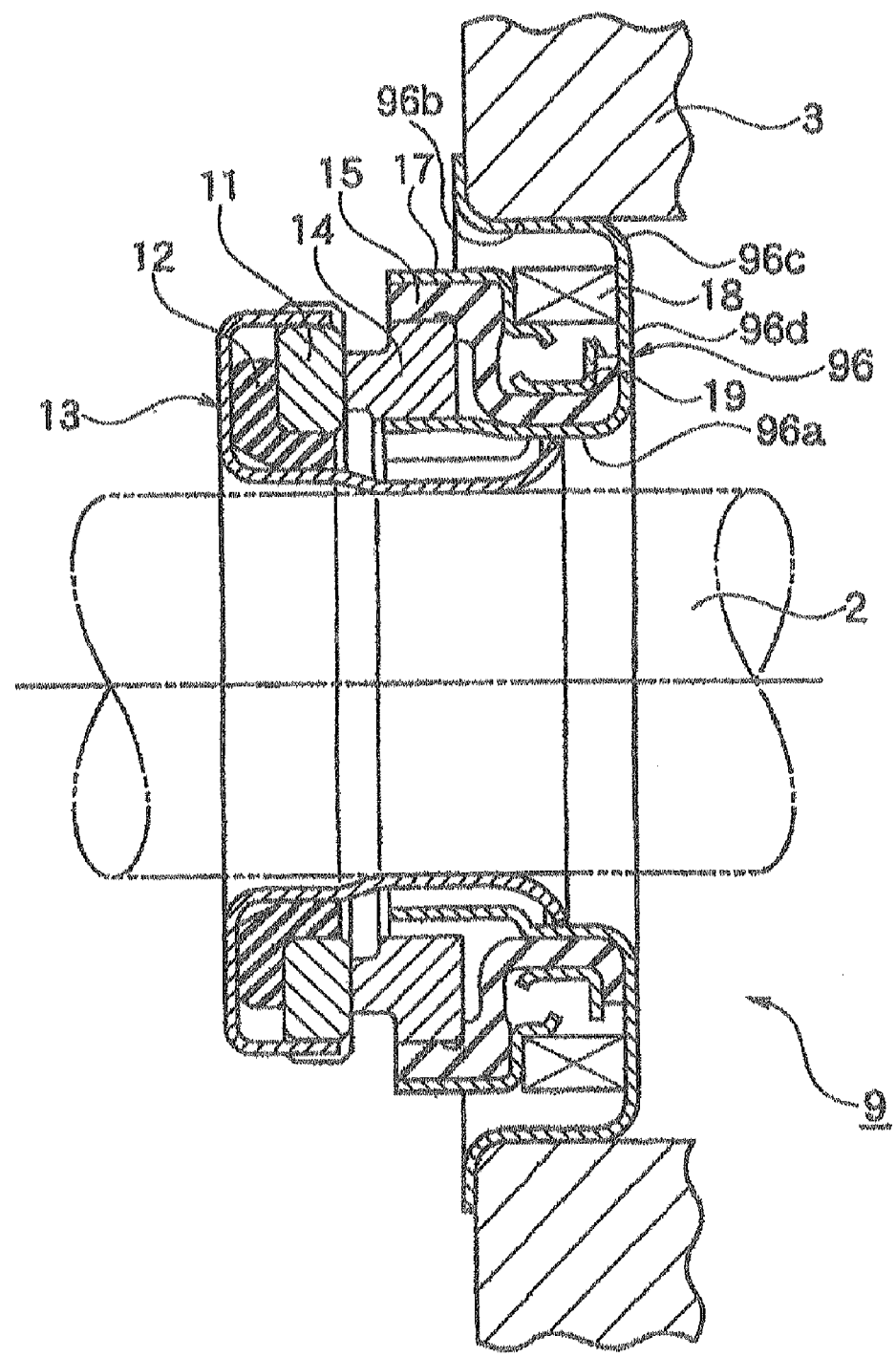
FIG. 8 shows the cross section of the seal.
Figure 9:
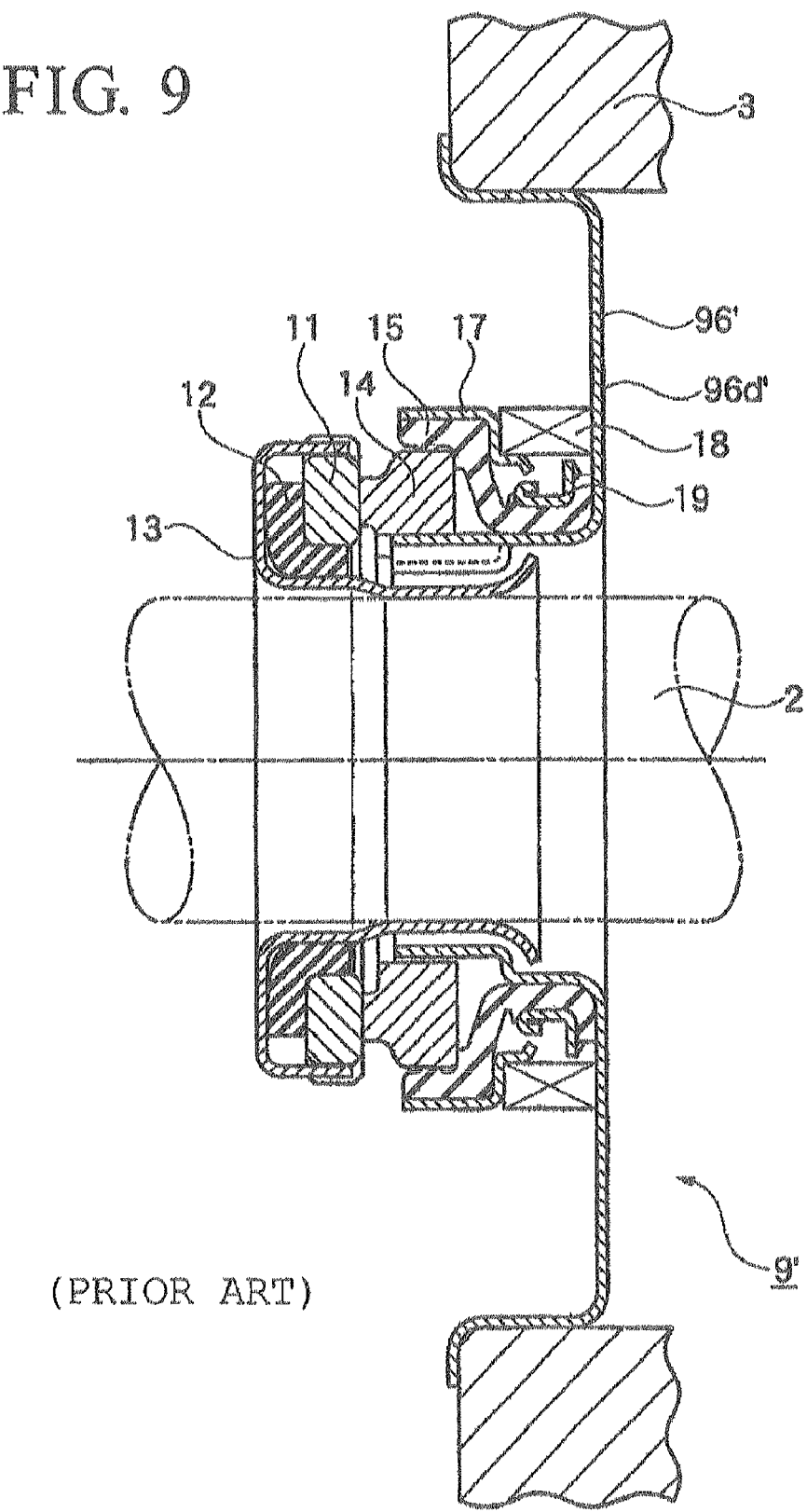
FIG. 9 shows the cross section of the constitution of the other conventional mechanical seal.

Next, the amount of the deformation of the mechanical seal according to the present invention shown in FIGS. 1 to 3, and the conventional mechanical seal shown in FIG. 8 is described.

Here the results of the amount of the deformation in the rotation axial direction of the position on the most rotation axis side at the back portion (the deformation analysis point) of the cartilage is shown, which is determined by the analysis software. Note that, the analysis was performed by using FEM analysis software Marc, and the tightening margin between the cartilage and the pump housing was set to 0.2 mm. The results of the analysis are shown in FIGS. 4 to 7, along with the amount of the deformation. Note that, the amount of the deformation is positive when it deforms towards the back side of the cartilage at the deformation analysis point, and the deformation towards the opposite side is set to negative.

Figure 4:
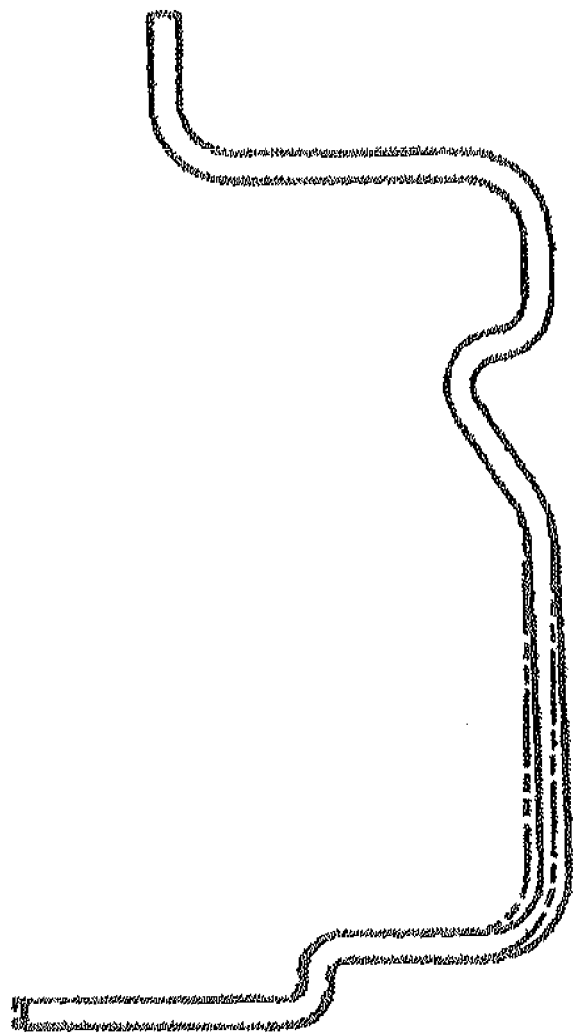
FIG. 4 shows, the amount of the deformation of the cartilage when the mechanical seal illustrated in FIG. 1 is engaged with the pump housing.

As shown in FIG. 4, the deformation of said deformation analysis point of the cartilage 16 forming the groove 16f shown in FIG. 1 at the back portion 16d was 0.15 mm to the back direction.

Figure 5:
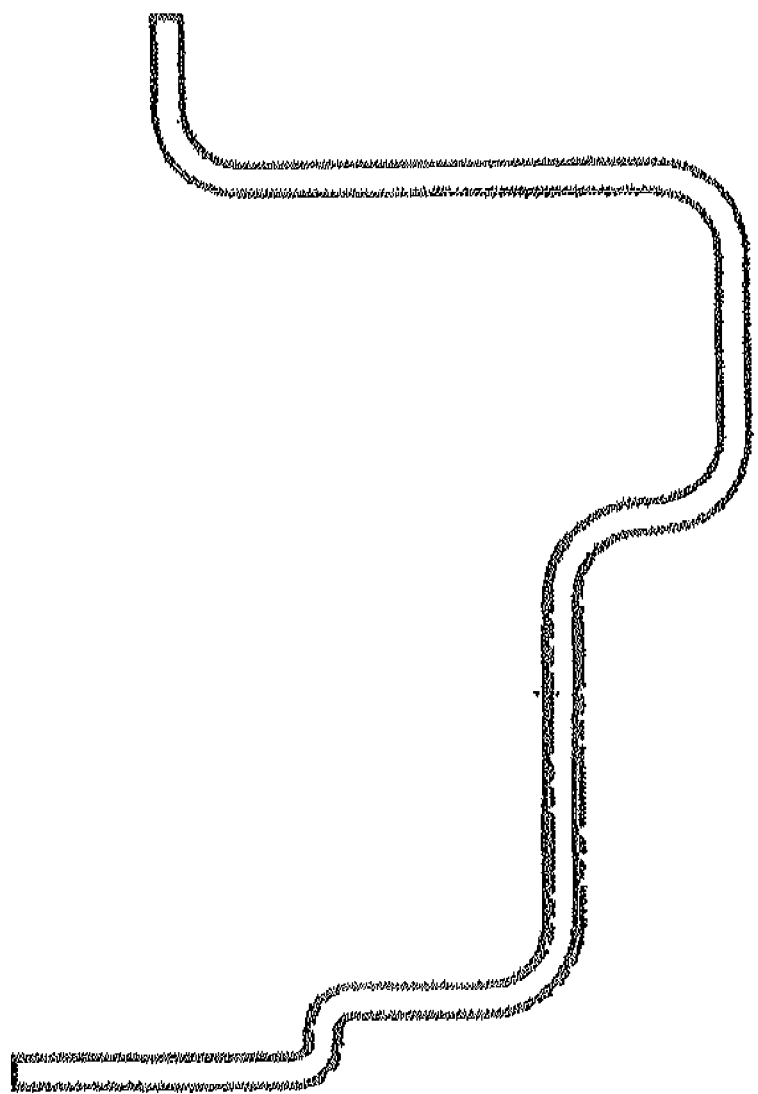
FIG. 5 shows the amount of the deformation of the cartilage when the mechanical seal comprising the cartilage illustrated in FIG. 2 is engaged with the pump housing.

Also, as shown in FIG. 5, the deformation of said deformation analysis point of the cartilage 26 forming the step 26f which the outer area 26h is protruding to the back direction at the back portion 26d shown in FIG. 2, was 0.01 mm to the opposite direction to the back.

Figure 6:
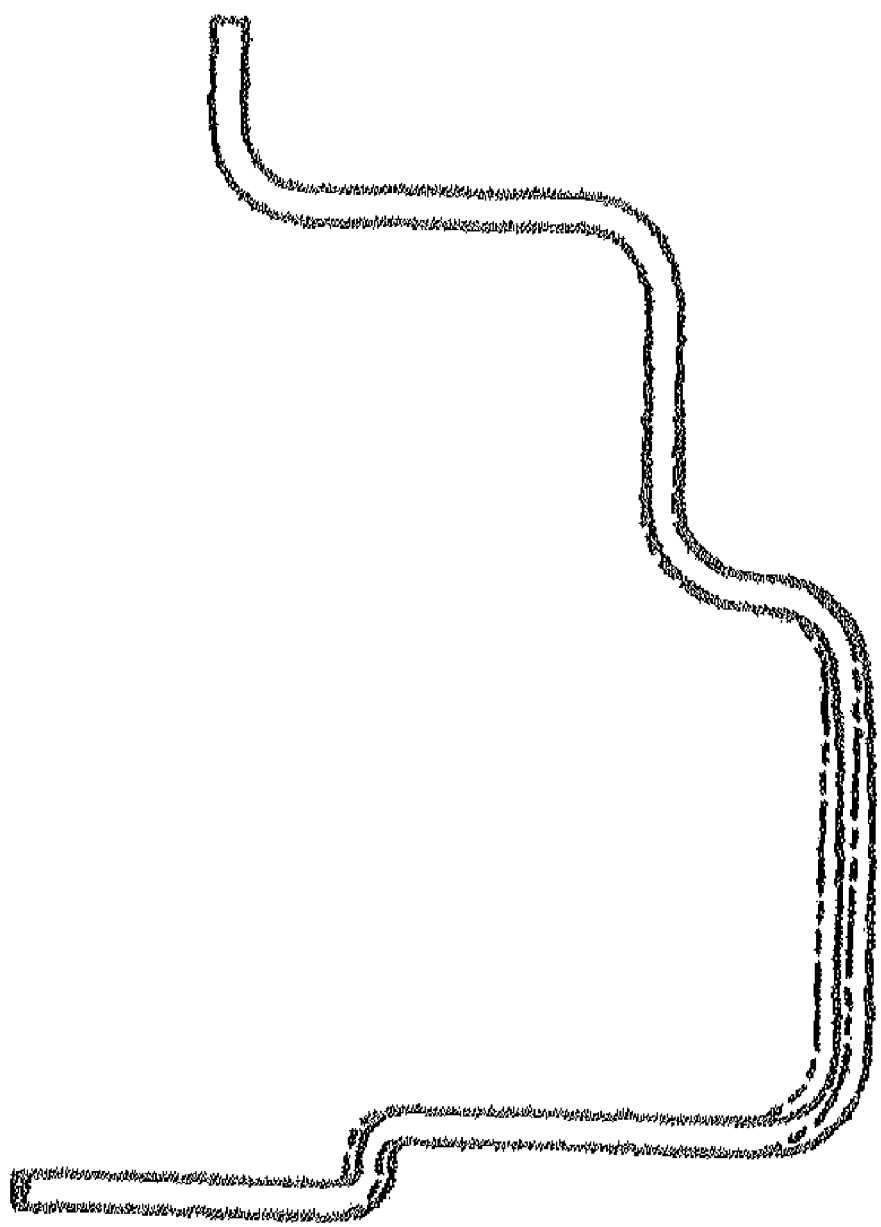
FIG. 6 shows the amount of deformation of the cartilage when the mechanical seal comprising the cartilage illustrated in FIG. 3 is engaged with the pump housing.

Furthermore, as shown in FIG. 6, the deformation of said deformation analysis point of the cartilage 36 forming the step 36f which the outer area 36h protrudes to the opposite direction of the back at the back portion 36d shown in FIG. 3 was 0.27 mm to the back direction.

Figure 7:
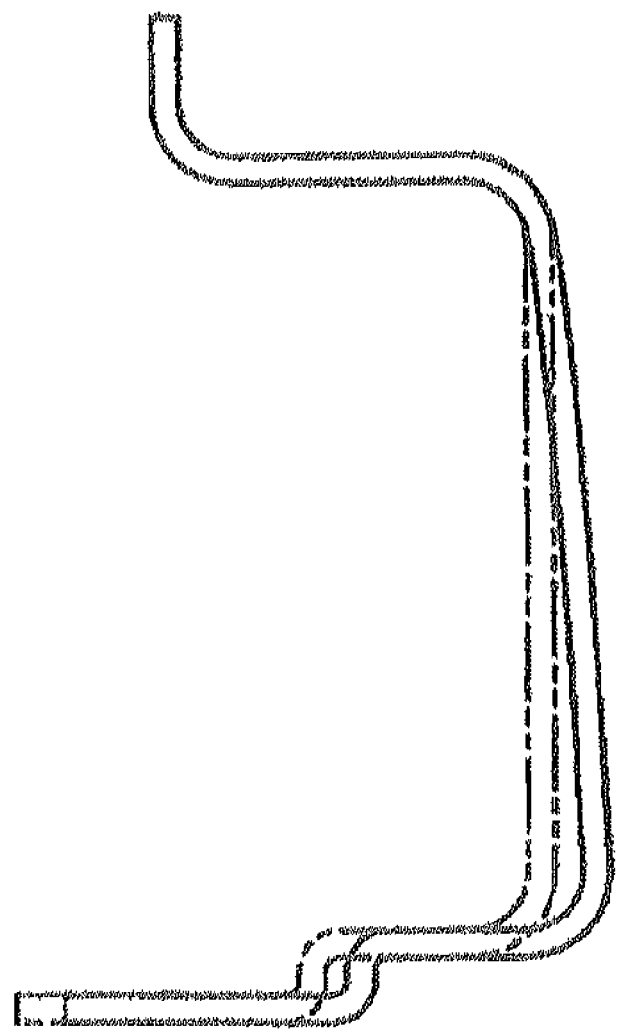
FIG. 7 shows the amount of the deformation of the cartilage when the conventional mechanical seal is engaged with the pump housing.

On the other hand, as shown in FIG. 7, the deformation of said analysis point of the conventional cartilage 96 having a flat back portion 16d shown in FIG. 8 was 0.82 mm to the back direction.

As evident from FIGS. 4 to 7, the amount of the deformation of the back portion (strictly, said deformation analysis point) of the cartilage according to the present invention shown in FIGS. 1 to 3, are remarkably lowered compared to the conventional cartilage as shown in FIG. 8. Particularly, in the cartilage forming the step at the back portion shown in FIG. 2 in which the outer area protrudes towards the back direction, the deformation is hardly seen.

Therefore, by placing the bending portion at the back portion of the cartilage as seen in the present invention, the deformation of the cartilage can be suppressed, and the changes in the assembling length of the mechanical seal can be suppressed.

Note that the embodiment mentioned above has been described to understand the present invention easier, thus it does not limit the scope of the present invention. Each element disclosed in the present embodiment includes all the designing modifications and the equivalents belonging to the technical scope of the present invention and any suitable and various modifications can be made.

INDUSTRIAL APPLICABILITY

The mechanical seal according to the present invention is a useful mechanical seal which maintain and exhibits good seal performance by suppressing the change of the assembling load, because the deformation to the rotation axis of the cartilage is suppressed when the mechanical seal is inserted to the pump housing. For example, it is especially useful for the water pump of the coolant pump or so of the car engine. Furthermore, it is not limited to such, and is useful mechanical seal for any arbitrary water pump, or the pump for sealing any arbitrary liquid.

The invention claimed is:

1. A mechanical seal comprising:
   a mating ring as a sliding member fixed to a rotation axis;
   a cartilage fixed to a housing;
   a seal ring attached to said cartilage for sliding with respect to said mating ring,
   wherein said cartilage comprises:
      an outer peripheral portion fixed to said housing,
      an inner peripheral portion placed around said rotation axis and provided with said seal ring,
      a back portion substantially perpendicular to the direction of said rotation axis connecting said outer peripheral portion and said inner peripheral portion, and
      a bending portion bending in a direction of said rotation axis, is formed on said back portion of said cartilage in a ring shape taking said rotation axis as a center;
   a bellows; and
   a coiled wave spring, wherein the bellows and the coiled wave spring are arranged in said inner peripheral portion of said cartilage,
   wherein said seal ring is pressed against said mating ring by the biasing force of said bellows and said coiled wave spring with an appropriate surface pressure,
   wherein said bending portion is formed on said back portion radially outside of said coiled wave spring and inwardly offset said outer peripheral portion, and
   wherein said bending portion is formed on a flat area of the back portion where no mechanical seal member is installed.

2. The mechanical seal as set forth in claim 1, wherein a groove portion having a concave shape in cross section is formed on said back portion of said cartilage in said ring shape taking said rotation axis as a center.

3. The mechanical seal as set forth in claim 1, wherein said back portion of said cartilage is formed so that axial positions of said back portion direction differ between an interior area and an exterior area in radial direction of said rotation axis; and a step portion connecting said interior area and the exterior area is formed in said ring shape taking said rotation axis as a center.

* * * * *